Patented Mar. 17, 1942

2,277,016

UNITED STATES PATENT OFFICE 2,277,016

PREPARATION OF ORGANIC COMPOUNDS

Herbert H. Guest, West Hartford, Conn., assignor to The J. B. Williams Company, Glastonbury, Conn., a corporation of Connecticut No Drawing. Application August 1, 1940, Serial No. 349,247

36 Claims. (Cl. 260—404)

This invention relates to the production of organic compounds and particularly to the preparation of new compounds useful in the production of cosmetic, toilet or other preparations. The present application is a continuation-in-part of my copending applications Serial No. 173,608, filed November 9, 1937, and Serial No. 301,559, filed October 27, 1939.

It is an object of this invention to provide new products suitable for use as detergents and/or as emulsifying or wetting agents, and/or as antioxidants. Such products are useful in various cosmetic or toilet preparations, such as soaps, shaving materials, soapless shampoos, creams, perspiration deodorants, lotions, to replace part or all of the soap in a dentifrice or detergent, as an antioxidant in compounds containing fatty acid radicals with unsaturated linkages and for many other uses, some of which are set forth in my copending application Serial No. 301,558, filed October 27, 1939. It includes the production of alkylol amino acids, alkylol amino acid amides, alkylol amino acid esters, and alkylol amino acid metal salts.

Another object is to provide improved procedures for producing such products. Other objects will become apparent.

In carrying out the present invention, a hydroxy alkyl amine may be reacted with a halogenated acid of the fatty acid series or with an ester of a halogenated acid of the fatty acid series, preferably in the presence of a solvent for the amine and for the acid or ester. It is preferred to use an alpha bromo acid or ester although a halogenated acid or ester may be used in which the halogen (bromine, chlorine or iodine) is not in the alpha position but, preferably, is close to that position. (For example, it has been found that a halogen on the seventh carbon atom from the alpha position will not work very satisfactorily.)

The hydroxyalkylamine displaces the halogen in the acid or ester to form the alkylol amine of the ester or acid used. For instance, the reaction of an halogenated alkyl ester of a fatty acid with diethanolamine may be illustrated as follows:

R·CH·Hal·COO Alkyl + 2NH(CH₂CH₂OH)₂ ⟶

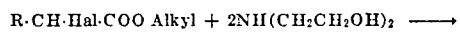 + (HOCH₂CH₂)₂NH·H·Hal

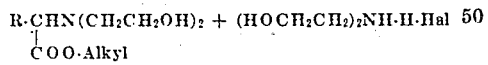

If the halogenated fatty acid is used in place of the ester, the product may be represented as follows:

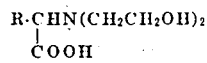

Either the acid or the ester product illustrated above may be reacted with a metal hydroxide or oxide to produce the metal salt or soap of the alkylol amino acid or ester which may be used for the purposes set forth above. For example, if potassium or sodium hydroxide is heated with the acid or ester product at steam bath temperatures, the following illustrates the product produced:

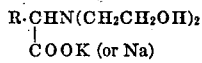

If the monoethanol amine is used in place of the diethanol amine, similar products may be prepared, of which the following is illustrative:

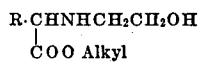

By further heating of the alkylol amino acid, alkylol amino acid ester or metal salt with additional quantities of the alkylolamine, the alkylolamine may be made to also displace the acid, salt, or ester group and form the alkylol amino acid amide, such, for example, as

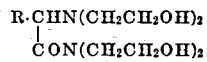

or

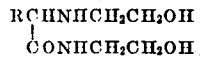

Other amines having a hydrogen atom connected directly to the nitrogen of the amino group may be used in place of the alkylol amine to displace the acid, alkyl or metal salt group.

The reaction between the hydroxy alkyl amine and the halogenated ester or acid of a fatty acid is preferably conducted while refluxing the solvent and at temperatures such that the desired reaction will take place but not sufficiently high to decompose the reacting ingredients or the compounds formed. Slightly lower temperatures may be used for the reaction of the halogenated acid than for the ester and considerably higher temperatures are required for the chlorine substituted products than for the bromine substituted ones. Temperatures of 75° to 200° C. have been found satisfactory and may be varied, depending upon the particular compounds being reacted and the product desired. It is, of course, desirable to keep the temperatures as low as practicable and in the production of the intermediate product it is preferred to use temperatures from 75° to 150° C. In the production of the alkylol amino acid amide by further heating of the alkylol amino esters, temperatures of 150° C. and over are preferred. With the alkylol amino acid the temperatures may be slightly lower, for example, 130° C. or over. The time of the reaction will depend upon the temperatures selected and the ingredients reacted and the product desired. Fifteen to ninety minutes and preferably fifteen to sixty minutes are illustrative of suitable ranges of time. The solvent used should be one that will not vaporize excessively under the conditions of operation. When refluxing is employed, a lower boiling point solvent may be used.

As a specific example of the process for producing the intermediate product, in which the reaction is interrupted after the halogen has been replaced but before the ester or acid group has been replaced, one mol of butyl alpha bromomyristate dissolved in half its volume of normal butyl alcohol may be heated with two mols of diethanol amine for about one hour at a temperature of about 100° C. At the end of this time the mixture becomes turbid and the heating may be stopped. After the heating is stopped, an insoluble oil settles to the bottom on standing for a few minutes. This layer, which is hydrobromide of diethanol amine with some unaltered amine, may be drawn off. The upper layer is the butyl ester of the substituted alpha amino myristate together with solvent, which latter may be removed by distillation, under reduced pressure if desired. The following formula is believed to illustrate the reaction that takes place:

$CH_3 \cdot (CH_2)_{11} \cdot CH \cdot Br \cdot COO \cdot C_4H_9 + 2NH \cdot (CH_2CH_2OH)_2 \longrightarrow$

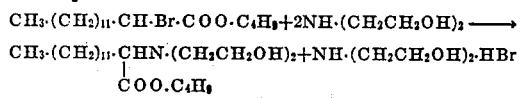
$CH_3 \cdot (CH_2)_{11} \cdot CHN \cdot (CH_2CH_2OH)_2 + NH \cdot (CH_2CH_2OH)_2 \cdot HBr$
$\quad\quad\quad\quad\quad |$
$\quad\quad\quad\quad\quad COO \cdot C_4H_9$ The product of the upper layer from the above described reaction is a clear oil but not distillable. It may be used directly in the products referred to above. For instance, water at 100° C. may be added and the resultant product can be used as a shampoo liquid or for other similar purposes. Also, and preferably, it may be readily saponified by heating at 100° C. with alcoholic potassium or sodium hydroxide solution in slight excess of the equimolar amounts. The resulting potassium or sodium salt may be recrystallized in colorless plate-like crystals from methanol. This salt is soluble in water and has powerful sudsing and detergent properties. On making the aqueous solution of this compound strongly acid with mineral acids, no insoluble acid is formed. In fact, the solution still foams copiously. The above example is a preferred example for the particular use under consideration, but many variations may be made to meet particular conditions or requirements. For example, other elements of the halogen group may be used in place of the bromine and other alkyl groups may be used in place of the myristate and butyl groups. For instance, methyl alpha bromo-myristate in butyl alcohol may be reacted with diethanolamine by heating at 120 to 150° C. for 30 to 60 minutes or until the oily layer separates to the bottom. Also, the monoalkylol amine may be used in the above reaction in place of the dialkylol amine. Dihalogenated esters, particularly the chloro derivatives, may also be used in place of the monohalogenated esters referred to.

As indicated above, the halogenated acid may be used in place of the halogenated ester, thus forming the acid of the compound with the alkylol amine substituted for the halogen. This acid may be reacted with potassium or sodium hydroxide to produce the salt as described above.

The above mentioned compounds also may be used as antioxidants or as emulsifying agents or as detergents or adjuvants in various cosmetic and toilet preparations, such, for example, as shaving creams and soaps. They may be used without discoloration and increase the lathering and sudsing properties of the soap. The amounts of each that can be used vary widely and the type of cosmetic or soap to be protected has to be considered in the choice and amount of the antioxidant, etc. The salts, for example, $R \cdot CHN \cdot (CH_2CH_2OH)_2 \cdot COOK$ (or Na etc.), may be used in any amount desired and give very good results. For antioxidant purposes the alkyl ester may be used in amounts up to about 2% by weight in soaps and up to about 5% in creams.

As another example of the production of the intermediate product, 70 parts of alpha bromostearic acid may be dissolved in 150 parts of benzene, and 40 parts of monoethanol amine (a slight excess over three mols to one of the bromostearic acid) may be slowly added. On gentle refluxing of the solvent of the mixture at about 80° C. for about 15 minutes, the mass solidifies. This solid product may be separated by filtering it and may be purified by dissolving it in potassium hydroxide solution and reprecipitating with mineral acid and filtering and washing with water. It may be used without further treatment. This solid is the free acid, illustrated by the formula

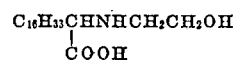
$C_{16}H_{33}CHNHCH_2CH_2OH$
$\quad\quad |$
$\quad\quad COOH$

It is not very soluble in alcohol and is very insoluble in water, but dissolves in sodium or potassium hydroxide solutions to give water-soluble salts.

In another example of the process for producing the intermediate product, to 40 parts by weight of methyl bromolaurate (one mol), dissolved in 50 parts of ethyl alcohol, 15 parts of diethanol amine (one mol) may be added. The mixture, which is homogeneous, may be heated for about 15 minutes at a temperature that causes gentle refluxing of the solvent (about 80° C.). No mechanical stirring is necessary. The heating may be interrupted and the amount of bromide ion (water soluble bromides) determined by analysis of a small test sample. The calculated amount of potassium hydroxide required to react with the bromide may be added and the precipitated potassium bromide may be removed by filtration. The heating, analyzing and adding potassium hydroxide may be repeated until all of the bromine in the original ester is removed. The alcohol may be then distilled off and the residual paste is ready for use without further purification. This product is the methyl ester, illustrated by the formula

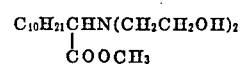
$C_{10}H_{21}CHN(CH_2CH_2OH)_2$
$\quad\quad |$
$\quad\quad COOCH_3$

Similar reactions may be effected with the halogenated palmitic acid or its ester.

As an example of a process for producing the product in which the ester group has also been displaced by the alkylol amine, using the methyl ester of the halogenated fatty acid, 50 parts by weight of methyl alpha bromo myristate, preferably carefully purified and colorless, may be heated with about 50 parts of diethanol amine and 50 parts of diethylene glycol. The mixture may be heated at a temperature of about 180 to 200° C. for about 60 to 90 minutes with stirring and refluxing of the solvent. The solvent and the alcohol formed by the reaction may be removed by distillation, preferably at reduced pressure. The ester of the halogenated acid is believed to react with the diethanol amine in accordance with the following formula:

$C_{12}H_{25}CH \cdot BrCOOCH_3 + 3[NH(CH_2CH_2OH)_2] \longrightarrow$ $C_{12}H_{25}CHN(CH_2CH_2OH)_2$
$|$
$CON(CH_2CH_2OH)_2 + (HOCH_2CH_2)_2NH \cdot HBr + CH_3OH$ As indicated by this formula, diethanol amine replaces the bromine in the ester and a further quantity of diethanol amine replaces the methyl ester radical. The hydrogen bromide from the ester combines with an additional quantity of the diethanol amine to form a hydrobromide of diethanol amine, which hydrobromide is very soluble in the reaction mixture. The halide may be separated from this compound by addition of sodium or potassium hydroxide, which precipitates the halide as the alkali salt and frees the diethanol amine for further use. Thus a quantity of potassium hydroxide (8¾ parts by weight) dissolved in a large excess of ethyl alcohol (100 parts by weight) may be added to the reaction mixture resulting from this procedure. The potassium bromide which separates may be removed by filtration. The alcohol may be distilled off and the residue may be used without further purification Similarly, the halogenated fatty acid may be used in the reaction described above in place of the ester to produce the amino acid amide, slightly lower temperatures or shorter times being required for such a reaction.

The amino acid amide resulting from the above described procedures is suitable for use as a substitute for soap in soapless shampoos, creams, lotions, and dentifrices. It is also useful as an emulsifying and wetting agent and as an antioxidant, for example, for minimizing rancidity in compounds containing fatty acid groups and is useful for preventing development of disagreeable perspiration odors.

When it is desired to introduce the alklyol amino group into the carboxyl group, as in the preparation of the amino acid amide, the acid chloride may be used in place of the acid or ester. For example, in the use of an alpha bromo acid chloride (e. g., $C_{12}H_{25}CHBrCOCl$), 80 grams of bromo myristyl chloride dissolved in 140 grams of ethylene dichloride may be cooled to ice water temperature and 30 grams of monoethanol amine dissolved in 100 grams of the same solvent may be slowly added. A solid separates (hydrochloric acid salt of the ethanol amine) and may be filtered off. The solvent may be removed from the product by distillation at reduced pressure, leaving a bromo amide $$\begin{pmatrix} C_{12}H_{25}CHBr \\ | \\ CONHCH_2CH_2OH \end{pmatrix}$$

which is a low melting solid.

This product may be dissolved in isobutyl alcohol and a slight excess of monoethanol amine may be added (over the calculated total proportion of two mols for each equilvalent of bromine in the compound). The mixture may be digested under a reflux condenser at temperatures of about 120 to 150° C. The displaced bromine may be removed with caustic potash and the solvent may be distilled off. The resulting solid product has a melting point of about 84 to 85° C. and is shown by analysis to have the formula $C_{12}H_{25}CHNHCH_2CH_2OH$
$|$
$CONGCH_2CH_2OH$ Thus it will be seen that the halogenated alkylol amide may be reacted with the alkylol amine in place of the halogenated acid or ester.

Many other variations may, of course, be made in the above described procedure in utilizing the present invention. For example, other aliphatic hydrocarbon radicals, preferably saturated, with or without side chains, may be used in place of the myristate, stearte, laurate and palmitate, etc. in the production of the intermediate or final substitution products referred to above. Such radicals, containing 6 to 22, and preferably 8 to 18, carbon atoms, may be used to advantage in the preparation of substances useful as detergents, emulsifying agents, etc. Hydrocarbon radicals containing 12 to 18 carbon atoms have been found particularly useful. It is not intended, however, to exclude the use in the reaction of acids or esters with radicals containing a smaller or a greater number of carbon atoms, such, for example, as the butyric or propionic acids or tetracosanoic or cerotic acids. For example, ethyl chloroacetic acid reacts with the alkylol amines spontaneously and with the evolution of heat. Such reaction may be controlled by chilling the reaction mixture.

Also, other halogens (such as chlorine or iodine) may be substituted for the bromine in the alpha or other halogenated ester. The methyl or butyl radical may also be replaced by other alkyl radicals, or, of course, in the acid, by hydrogen. Examples of other compounds useful for this purpose are ethyl bromo laurate, ethyl chloro stearate and bromo myristic acid. Many other suitable compounds will be apparent from the examples given.

Other solvents may also be used, such solvents being preferably ones that completely dissolve the hydroxy alkyl amine and that at least partially dissolve the halogenated aliphatic acid or ester thereof and which have a sufficiently high boiling point to avoid escaping under the reaction conditions and to permit the reaction to take place. For instance, the solvent should be one that will remain in the retort or autoclave so that the desired reaction temperature may be attained. Pressure may be applied if a low boiling point solvent is used. Solvents having a boiling point of 160° C. or more, such, for example, as diethylene glycol and the ethyl or butyl ethers of diethylene glycol, or high boiling monohydric alcohols, may be used and are particularly useful in the introduction of the alkylol amine into the carboxyl group Also, with reactions that take place at lower temperatures and with adequate refluxing solvents having lower boiling points such as butyl alcohol (B. P. 117° C.), ethyl alcohol (B. P. 78° C.), or hydrocarbons such as benzene (B. P. 80° C.), or toluene (B. P. 110° C.), may be used. If pressure is applied, still lower boiling point solvents may be used.

Other hydroxy alkyl amines may be used in place of ethanol amines; for example, methanol amines or propanol amines. In the preferred operations, it is desirable to use a hydroxy alkyl amine containing at least one hydrogen atom connected to the nitrogen of the amine group. For example, the monoethanol amine or mono- or dialkylol amines containing other alkyl groups (which, in the case of the dialkylol amines, may be like or different from each other), may be used in place of ethanol amine.

In the production of the compounds referred to above, it may be desirable to use an excess of the amine over the molecular reacting proportions. This excess may be removed, along with the solvent, during the distillation under reduced pressure. With the higher boiling solvents, this distillation may, for example, be carried out at a temperature of about 160 to 190° C. and at an absolute pressure of about 5 to 20 mm. of mercury. Operating at 175° C. and 10 mm. of pressure, for example, the distillation may be continued until the weight of distillate is approximately equal to the weight of solvent and excess amine. In some instances, it may be desirable to remove the excess of the amine by the process of "salting out." For example, the mixture resulting from the reaction may be added to water acidified with hydrochloric acid and sodium chloride may be added. The amine goes into the aqueous layer at the bottom while the reaction product will form a layer on top. The bromide will also go with the aqueous layer and may be washed out and into that layer.

The amount of solvent used in the reaction should be sufficient to form a homogeneous solution on heating. An excess does no harm in the reaction and may be removed during the vacuum distillation, or otherwise.

Various other modifications of the invention in using it for other purposes will be apparent to those skilled in the art.

Particular temperatures, proportions, times, etc. referred to in this application are merely illustrative and are not intended to limit the scope of the invention. The terms used in describing the invention have been used in their descriptive sense and not as terms of limitation and it is intended that all equivalents of the terms used be included within the scope of the appended claims.

No claim is made herein to particular uses of the products described herein, which are claimed in applicant's copending application, Serial No. 379,911, filed February 21, 1941. Also, claims directed to the reaction of the ester of the alpha halogenated aliphatic monocarboxylic acid and products resulting therefrom are included in applicant's copending application, Serial No. 173,608, filed November 9, 1937.

I claim:

1. A method of producing an organic compound comprising reacting an alkylol amine, having at least one hydrogen atom connected to the nitrogen of the amino group, with a halogenated aliphatic compound, in which the halogen is connected to a carbon of the aliphatic compound not more than 7 carbon atoms distant from the alpha position, of the class consisting of monocarboxylic acids, esters and alkylol amides of the halogenated aliphatic compound, to replace the halogen with the alkylol amine.

2. A method of producing an organic compound comprising reacting an alkylol amine, having at least one hydrogen atom connected to the nitrogen of the amino group, with an alpha halogenated aliphatic compound, containing 6 to 22 carbon atoms in the aliphatic group, of the class consisting of monocarboxylic acids, esters and alkylol amides of the halogenated aliphatic compound, to replace the halogen with the alkylol amine.

3. A method of producing an organic compound comprising reacting an alkylol amine, having at least one hydrogen atom connected to the nitrogen of the amino group, with an alpha brominated aliphatic compound, containing 8 to 18 carbon atoms in the aliphatic group, of the class consisting of monocarboxylic acids, esters and alkylol amides of the brominated aliphatic compound, to replace the bromine with the alkylol amine.

4. A method of producing an organic compound comprising reacting an alkylol amine, having at least one hydrogen atom connected to the nitrogen of the amino group, with an alpha halogenated aliphatic monocarboxylic acid containing 8 to 18 carbon atoms in the aliphatic group to replace the halogen with the alkylol amine.

5. A method of producing an organic compound comprising reacting an alkylol amine, having at least one hydrogen atom connected to the nitrogen of the amino group, with an alkylol amide of an alpha halogenated aliphatic monocarboxylic acid containing 8 to 18 carbon atoms in the aliphatic group to replace the halogen with the alkylol amine.

6. A method of producing an organic compound comprising reacting an alkylol amine, having at least one hydrogen atom connected to the nitrogen of the amino group, with a halogenated aliphatic compound, in which the halogen is connected to a carbon of the aliphatic chain not more than 7 atoms distant from the alpha position, of the class consisting of monocarboxylic acids, esters and alkylol amides of the halogenated aliphatic compound, to replace the halogen with the alkylol amine, and subjecting the product to treatment with a compound of the group consisting of metal oxides and metal hydroxides.

7. A method of producing an organic compound comprising heating an alkylol amine, having at least one hydrogen atom connected to the nitrogen of the amino group, with an alpha halogenated aliphatic compound of the class consisting of monocarboxylic acids, esters and alkylol amides of the halogenated aliphatic compound, in the presence of a solvent for the amine and the halogenated compound, to replace the halogen with the alkylol amine.

8. A method of producing an organic compound comprising heating an alkylol amine, having at least one hydrogen atom connected to the nitrogen of the amino group, with an alpha halogenated aliphatic compound of the class consisting of monocarboxylic acids, esters and alkylol amides of the halogenated aliphatic compound, at a temperature of about 75 to 210° C. in the presence of and while refluxing a solvent for the amine and the halogenated compound.

9. A method of producing an organic compound comprising heating an alkylol amine, having at least one hydrogen atom connected to the nitrogen of the amino group, with an alpha halogenated aliphatic compound, having 12 to 18 carbon atoms in the aliphatic group, of the class consisting of monocarboxylic acids, esters and alkylol amides of the halogenated aliphatic compound, at a temperature of about 75 to 210° C. in the presence of and while refluxing a solvent for the amine and the halogenated compound.

10. A method of producing an organic compound comprising reacting an alkylol amine, having at least one hydrogen atom connected to the nitrogen of the amino group, with an alpha halogenated aliphatic compound of the class consisting of monocarboxylic acids, esters and alkylol amides of the halogenated aliphatic compound, until the halogen has been replaced and the acid and ester groups present in the compound have been amidized.

11. A method as defined in claim 10 in which the reacting products are heated to temperatures of 170 to 210° C. in the presence of a refluxing solvent.

12. A method as defined in claim 1 in which the halogen is bromine.

13. A method as defined in claim 2 in which the alkylol amine is an ethanol amine.

14. A method as defined in claim 6 in which the metal hydroxide is an alkali metal hydroxide.

15. A method of producing an organic compound comprising heating an ethanol amine, having at least one hydrogen atom connected to the nitrogen of the amino group, with an alpha brominated compound of the class consisting of monocarboxylic acids, esters and alkylol amides of the brominated aliphatic compound at a temperature of about 75 to 150° C. while refluxing in the presence of a solvent for the amine and the halogenated compound.

16. A method as defined in claim 15 in which the reaction product is heated to about 100° C. in the presence of an alcoholic solution of an alkali metal hydroxide.

17. A method of producing an organic compound comprising reacting an alkylol amine, having at least one hydrogen atom connected to the nitrogen of the amino group, with a halogenated aliphatic compound, in which the halogen is connected to a carbon of the aliphatic chain not more than 7 carbon atoms distant from the alpha position, of the class consisting of monocarboxylic acids, esters and alkylol amides of the aliphatic compound, and arresting the reaction after the halogen has been replaced by the alkylol amine and before the acid and ester groups present in the compound have been amidized.

18. A method of producing an organic compound comprising heating an alkylol amine, having at least one hydrogen atom connected to the nitrogen of the amino group, with an alpha halogenated aliphatic compound of the class consisting of monocarboxylic acids, esters and alkylol amides of the halogenated aliphatic compound, in the presence of a solvent for the amine and the halogenated compound, and arresting the reaction after the halogen has been replaced by the alkylol amine and before the acid and ester groups present in the compound have been amidized.

19. A method of producing an organic compound comprising reacting an alkylol amine, having at least one hydrogen atom connected to the nitrogen of the amino group, with an alpha halogenated aliphatic compound, containing 6 to 22 carbon atoms in the aliphatic group, of the class consisting of monocarboxylic acids, esters and alkylol amides of the halogenated aliphatic compound, arresting the reaction after the halogen has been replaced by the alkylol amine and before the acid and ester groups present in the compound have been amidized, and reacting the resulting compound with a compound of the class consisting of metal oxides and metal hydroxides.

20. A method as defined in claim 19 in which the metal hydroxide is an alkali metal hydroxide.

21. A method of producing an organic compound comprising heating an alkylol amine, having at least one hydrogen atom connected to the nitrogen of the amino group, with an alpha halogenated aliphatic compound containing 6 to 22 carbon atoms in the aliphatic group, of the class consisting of monocarboxylic acids, esters and alkylol amides of the halogenated aliphatic compound, at a temperature of about 75 to 150° C. for 15 to 60 minutes.

22. A method of producing an organic compound comprising heating an ethanol amine, having at least one hydrogen atom connected to the nitrogen of the amino group, with an alpha halogenated aliphatic compound containing 12 to 18 carbon atoms in the aliphatic group, of the class consisting of monocarboxylic acids, esters and alkylol amides of the halogenated aliphatic compound, at a temperature of about 75 to 150° C. for 15 to 60 minutes in the presence of and while refluxing a solvent for the ethanol amine.

23. A new product resulting from reacting an alkylol amine, having at least one hydrogen atom connected to the nitrogen of the amino group, with an alpha halogenated aliphatic compound, containing 6 to 22 carbon atoms in the aliphatic group, of the class consisting of monocarboxylic acids, esters and alkylol amides to replace the halogen with the alkylol amine.

24. A new product resulting from reacting an alkyol amine, having at least one hydrogen atom connected to the nitrogen of the amino group, with an alpha halogenated aliphatic compound, containing 6 to 22 carbon atoms in the aliphatic group, of the class consisting of monocarboxylic acids, esters and alkylol amides to replace the halogen with the alkylol amine, and subjecting the product to treatment with a compound of the group consisting of metal oxides and metal hydroxides.

25. A new product resulting from reacting an alkylol amine, having at least one hydrogen atom connected to the nitrogen of the amino group, with an alpha halogenated aliphatic compound, containing 12 to 18 carbon atoms in the aliphatic group, of the class consisting of monocarboxylic acids, esters and alkylol amides at a temperature of about 75 to 210° C. in the presence of and while refluxing a solvent for the amine and the halogenated compound, to replace the halogen with the alkylol amine.

26. A new product resulting from reacting an alkylol amine, having at least one hydrogen atom connected to the nitrogen of the amino group, with an alpha halogenated aliphatic compound, containing 6 to 22 carbon atoms in the aliphatic group, of the class consisting of monocarboxylic acids, esters and alkylol amides to replace the halogen with the alkylol amine and to amidize the acid and ester groups present in the compound.

27. A new product resulting from reacting an alkylol amine, having at least one hydrogen atom connected to the nitrogen of the amino group, with an alpha halogenated aliphatic compound, containing 6 to 22 carbon atoms in the aliphatic group, of the class consisting of monocarboxylic acids, esters and alkylol amides and arresting the reaction after the halogen has been replaced by the alkylol amine but before the acid and ester groups present in the compound have been amidized.

28. A new product resulting from reacting an alkylol amine, having at least one hydrogen atom connected to the nitrogen of the amino group, with an alpha halogenated aliphatic compound, containing 6 to 22 carbon atoms in the aliphatic group, of the class consisting of monocarboxylic acids, esters and alkylol amides, arresting the reaction after the halogen has been replaced by the alkylol amine but before the acid and ester groups present in the compound have been amidized, and subjecting the product to treatment with a compound of the group consisting of metal oxides and metal hydroxides.

29. A new product resulting from reacting an alkylol amine, having at least one hydrogen atom connected to the nitrogen of the amino group, with an alpha halogenated monocarboxylic aliphatic acid having 6 to 22 carbon atoms in the aliphatic group and arresting the reaction after the halogen has been replaced by the alkylol amine but before the acid group present in the compound has been amidized.

30. A new product resulting from reacting an alkoylol amine, having at least one hydrogen atom connected to the nitrogen of the amino group, with an ester of an alpha halogenated monocarboxylic aliphatic acid having 6 to 22 carbon atoms in the aliphatic group and arresting the reaction after the halogen has been replaced by the alkoylol amine but before the ester group present in the compound has been amidized.

31. A new product resulting from reacting an alkylol amine, having at least one hydrogen atom connected to the nitrogen of the amino group, with an alpha halogenated monocarboxylic aliphatic acid having 6 to 22 carbon atoms in the aliphatic group, arresting the reaction after the halogen has been replaced by the alkoylol amine but before the acid group present in the compound has been amidized, and reacting the product with a compound of the group consisting of metal oxides and metal hydroxides.

32. A new product resulting from reacting an alkoylol amine, having at least one hydrogen atom connected to the nitrogen of the amino group, with an ester of an alpha halogenated monocarboxylic aliphatic acid having 6 to 22 carbon atoms in the aliphatic group, arresting the reaction after the halogen has been replaced by the alkylol amine but before the ester group present in the compound has been amidized, and reacting the product with an alkali metal hydroxide of the class consisting of sodium and potassium hydroxides.

33. A method of producing an organic compound comprising heating an alkylol amine, having at least one hydrogen atom connected to the nitrogen of the amino group, with an alpha halogenated monocarboxylic aliphatic acid having 6 to 22 carbon atoms, and arresting the reaction after the halogen has been replaced by the alkylol amine but before the acid group present in the compound has been amidized.

34. A method of producing an organic compound comprising heating an alkylol amine, having at least one hydrogen atom connected to the nitrogen of the amino group, with an ester of an alpha halogenated monocarboxylic aliphatic acid having 6 to 22 carbon atoms in the aliphatic group, and arresting the reaction after the halogen has been replaced by the alkylol amine but before the ester group present in the compound has been amidized.

35. A method of producing an organic compound comprising heating an alkylol amine, having at least one hydrogen atom connected to the nitrogen of the amino group, with an alpha halogenated monocarboxylic aliphatic acid having 6 to 22 carbon atoms in the aliphatic group, arresting the reaction after the halogen has been replaced by the alkylol amine but before the acid group present in the compound has been amidized, and reacting the product with an alkali metal hydroxide.

36. A method of producing an organic compound comprising heating an alkylol amine, having at least one hydrogen atom connected to the nitrogen of the amino group, with an ester of an alpha halogenated monocarboxylic aliphatic acid, having 6 to 22 carbon atoms in the aliphatic group, arresting the reaction after the halogen has been replaced by the alkylol amine but before the ester group present in the compound has been amidized, and reacting the product with an alkali metal hydroxide of the class consisting of sodium and potassium hydroxides.

HERBERT H. GUEST.